Figure 1:
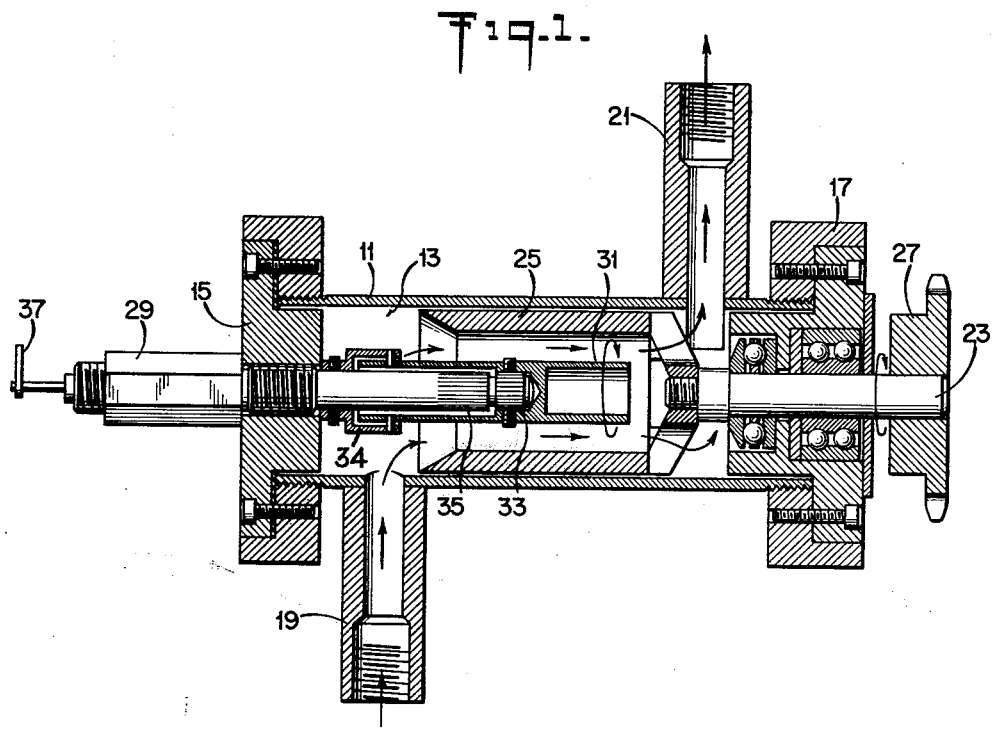

April 14, 1964

S. S. GUPTA 3,128,620

TORQUE TUBE ROTATIONAL VISCOMETER

Filed Nov. 28, 1961

INVENTOR
SATYABRATA S. GUPTA

BY *Maurice W. Ryan*

ATTORNEY

United States Patent Office 3,128,620
Patented Apr. 14, 1964

3,128,620
TORQUE TUBE ROTATIONAL VISCOMETER
Satyabrata Sen Gupta, Charleston, W. Va., assignor to Union Carbide Corporation, a corporation of New York
Filed Nov. 28, 1961, Ser. No. 155,368
2 Claims. (Cl. 73—60)

The present invention relates to a novel apparatus for continuously measuring fluid viscosity and more particularly to apparatus which measures viscosity by sensing torque transmitted through an annulus of fluid passing through the viscometer apparatus when an outer peripheral surface of said annulus of fluid has imparted thereto a rotational force.

Many industrial processes for the continuous production of fluids for use as end products or intermediates require accurate and continuous determination of fluid viscosity. In the commercial production of plastic resins, for example, end product quality can be controlled to a great extent if viscosity of the material in process is known during intermediate production steps. Application of known laboratory techniques for viscosity determination frequently involves difficult and time consuming steps which are generally unsuited for continuous plant stream production processes. In addition, laboratory type viscosity measurement methods, with attendant time delays in the production of useful output data, militate against process automation. Automatic closed loop viscosity control systems could be readily incorporated into many processes when a dependable, accurate continuous sensing viscometer is available. Such a viscometer must be rugged in structure, have low pressure drop characteristics or built-in pumping or boosting action to maintain a reasonably fast flow of highly viscous fluids through the viscometer, have adequate and easily changeable range capabilities and a continuous instantaneous and accurate response to viscosities encountered in order to be adaptable to plant stream utilization. It is also desirable that such a viscometer have the ability to respond properly to high or low viscosities, operate at elevated temperatures and high flow drag forces and include means for accurate temperature control or permit adoption of a reliable and accurate method for temperature compensation with respect to fluids being tested.

The apparatus of the present invention comprehends all of the above mentioned features desired in a viscometer suitable for continuous plant process stream viscosity measurement and provides means for a viscosity measurement method which comprises directing a fluid stream through an annular space, imparting rotational shearing force to an outer peripheral surface of the fluid stream in said annular space, sensing torque transmitted through the fluid annulus at a cylindrical inner surface of the stream in said annular space and converting the torque sensed at the inner cylindrical surface of the fluid annulus to an output signal which is representative of fluid viscosity.

Figure 2:
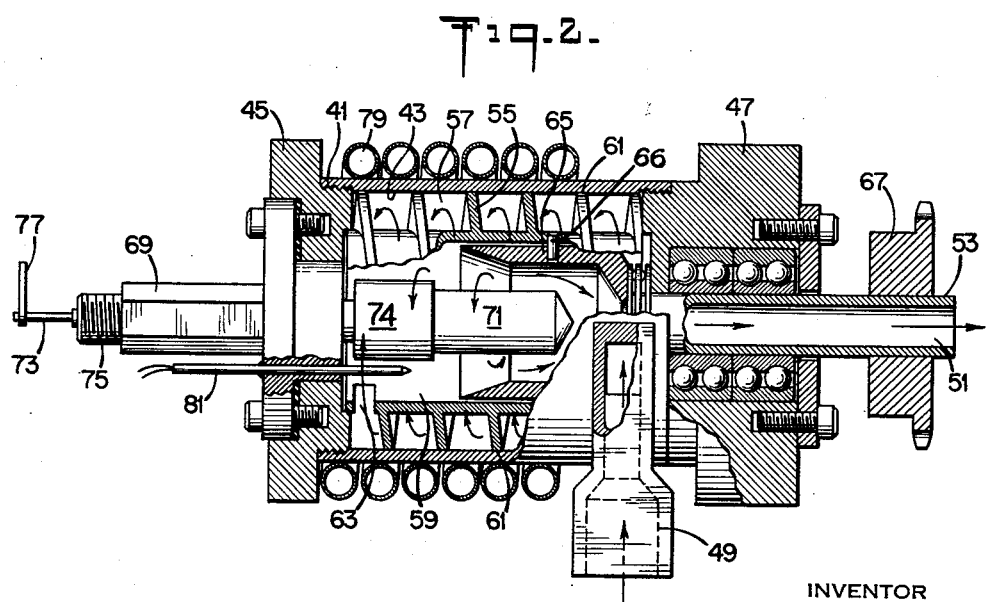

Other features and advantages of the present invention will be apparent to persons familiar with the art from examination of the ensuing detailed description and the accompanying drawings in which:

FIGURE 1 is an elevational sectional view of an embodiment of apparatus according to the present invention, and FIGURE 2 is an elevational sectional view of an alternative embodiment of apparatus according to the present invention.

With reference to the drawings, FIGURE 1 illustrates a viscometer according to the present invention comprising a body 11 having a hollow cylindrical interior 13 extending therethrough, a cap assembly 15 closing one end of the hollow interior and a base assembly 17 closing the other end. A conduit 19 defines a fluid inlet passage connecting to the interior 13 of the device and a conduit 21 defines a fluid outlet passage connecting to the interior 13 of the device. A shaft 23 is rotatably mounted in and extends through base assembly 17 in longitudinal concentric alignment with the hollow cylindrical interior 13. A hollow cylindrical rotor 25 is arranged concentrically in interior 13 to impart rotational shearing force to fluid passing through said interior and is operably connected to a shaft 23. Gear 27 provides means for imparting rotational movement to shaft 23 with any suitable motive source. A torque-sensitive tube assembly 29 extends through cap assembly 15 into and in concentric alignment with the hollow cylindrical interior 13 and comprises a torque sleeve 31 coaxially aligned on and attached to a frictionless torque-transmitting shaft 33 arranged in a protective tubular sleeve 35. An end portion of torque sleeve 31 extends into an over-range protection mantle assembly 34 which is attached to tubular sleeve 35. A torque arm 37 is attached to an externally extending end of the torque-transmitting shaft 33 and provides means for converting sensed torque to a useable mechanical output signal which may be applied to any desired apparatus such as a pneumatic or electrical transmitter device, a recorder or indicator calibrated in units of viscosity or to a servo generator unit comprised in a closed loop control system.

In operation of the embodiment described above and illustrated in FIGURE 1 of the drawings, a fluid enters the viscometer through inlet conduit 19, fills the hollow cylindrical interior 13 and passes out of the viscometer through outlet conduit 21. A fluid annulus is defined between the peripheral surface of torque sleeve 31 and the cylindrical interior surface of rotor 25. Motive means operably connected to gear 27 imparts rotational movement to shaft 23 and the rotor 25. As rotor 25 moves around the fluid annulus defined in the viscometer, it imparts rotational shear to the fluid annulus which is transmitted, to a degree proportional to the fluid viscosity, to the peripheral surface of torque sleeve 31. Torque sleeve 31 twists to a degree proportional to rotational force impinging upon its peripheral surface and thus to a degree proportional to fluid viscosity. A torsional moment thus developed in torque sleeve 31 is transmitted without any frictional losses through torque transmitting shaft 33 to the torque arm 37 from which signal conversion or take-off may be effected.

FIGURE 2 of the drawings illustrates an alternative embodiment of a viscometer according to the present invention comprising a body 41 having a hollow interior defined by a cylindrical wall 43 extending longitudinally therethrough, a cap assembly 45 closing one end of the hollow interior and a base assembly 47 closing the other end. A slightly tapered helical screw 55 having a cylindrical hollow interior extends concentrically through the viscometer interior and divides it into an outer heliform passage 57 and an inner cylindrical passage 59. A spiral peripheral land surface 61 on screw 55 is arranged in sliding contact with cylindrical wall 43. A passage 63 connects outer heliform passage 57 with the inner cylindrical passage 59. A conduit 49 defines a fluid inlet passage connecting to the outer heliform passage 57. A shaft 53 is rotatably mounted in and extends through base assembly 47 in longitudinal concentric alignment with helical screw 55. Shaft 53 has a bore extending therethrough which defines a fluid outlet passage 51 connecting inner cylindrical passage 59 with the viscometer exterior. A hollow cylindrical rotor 65 is arranged concentrically in inner cylindrical passage 59 to impart rotational force to fluid passing through said inner cylindrical passage and is operably connected to shaft 53.

The hollow cylindrical rotor 65 may be selectively connected to the helical screw 55 by means such as pin 66 when pumping or booster action is desired to implement the flow of highly viscous fluids through the viscometer. In both engaged and disengaged arrangement with the rotor 65, helical screw 55 provides a long heat exchange path for temperature stabilization and control. Gear 67 provides means for imparting rotational movement to shaft 53 with any suitable motive source. A torque-sensitive tube assembly 69 extends through cap assembly 45 into and in concentric alignment with the inner cylindrical passage 59 and comprises a torque sleeve 71, coaxially aligned on and attached to a torque-transmitting shaft 73 arranged in a protective tubular sleeve 75. An end portion of torque sleeve 71 extends into an over-range protection mantle assembly 74 which is attached to tubular sleeve 75. A torque arm 77 is attached to an externally extending end of the torque-transmitting shaft 73 and provides means for converting sensed torque to a useable mechanical output signal which may be applied to any desired apparatus such as a pneumatic or electrical transmitter device, a recorder or indicator calibrated in units of viscosity or to a servo generator unit comprised in a closed loop control system. In the event that temperature control is desired, a heating coil 79 may be provided on body 41 of the viscometer to conduct a temperature controlled fluid medium continuously around the viscometer. Temperature of the heating coil fluid may be controlled according to a thermosensitive element 81 extending through cap assembly 45 into the fluid in the interior of the viscometer.

In operation of the embodiment described above and illustrated in FIGURE 2 of the drawings, motive means operably connected to gear 67 imparts rotational movement to shaft 53, rotor 65 and optionally to the helical screw 55. Fluid enters the viscometer through inlet conduit 49 into outer heliform passage 57 where it is forced by the rotating helical screw completely through the heliform passage and through connecting passage 63 into the inner cylindrical passage 59, which it fills, and out through outlet passage 51 in the shaft 53. Alternatively, the helical screw may be disengaged from the rotor and made to act simply as a long heat exchange path in tests involving less viscous fluids. In such usage helical screw 55 may be pinned to the base assembly 47 to advantage. A fluid annulus is defined between the peripheral surface of torque sleeve 71 and the cylindrical interior surface of rotor 65. As rotor 65 moves around the fluid annulus thus defined, it imparts rotational shear to the fluid annulus which is transmitted, to a degree proportional to the fluid viscosity, to the peripheral surface of torque sleeve 71. Torque sleeve 71 twists to a degree proportional to rotational force impinging upon its peripheral surface and thus to a degree proportional to fluid viscosity. A torsional moment thus developed in torque sleeve 71 is transmitted without frictional losses through torque transmitting shaft 73 to the torque arm 77 from which signal conversion or take-off may be effected.

The design of the embodiment shown in FIGURE 1 of the drawings comprehends forcing fluid through the viscometer by line pressure alone. This arrangement may be preferred for fluids which are not too viscous and where temperature compensation is satisfactory. The embodiment of FIGURE 2 may be preferred for more viscous resins or in cases where a relatively long heat exchange path is desired for temperature stabilization and control. Here it should be noted however, that the embodiment of FIGURE 1 is readily adaptable to temperature control by means similar to the heating coil and thermosensitive element illustrated in connection with FIGURE 2. The viscosity of a fluid such as a molten resin is a function of its temperature and, since temperature in a continuously flowing stream may vary from time to time, temperature control may be employed to very great advantage in obtaining accurate viscosity readings. To this end, the relatively long temperature-controlled path for fluids passing through the viscometer of FIGURE 2 will prove advantageous.

Errors due to temperature variations may also be corrected by a graphical method of compensation. Calibration curves of the viscometer at several temperatures with close intervals may be provided on a graph showing fluid viscosity at a standard temperature versus viscometer readings. With such a graph extrapolation may be used by an operator to obtain temperature-corrected viscosity values.

Automatic temperature compensation systems may also be used to advantage with the apparatus of the present invention. In a typical system of this type, an error signal is supplied by a temperature probe such as thermosensitive element 81, for any deviation from a preselected temperature. The error signal may be fed into a simple pneumatic or electronic computer unit simultaneously with a signal from the torque arm of the viscometer, the computer being adapted to furnish an output signal representative of temperature-corrected viscosity referred to the preselected base temperature.

Either of the illustrated embodiments as well as other possible embodiments according to my invention are readily adaptable to a wide range of viscosity measurements since torque tubes may be selected for desired specific ranges. Limited range changes may also be obtained by varying mechanical linkages connected to the torque arm, by varying rotational speed of the rotational drive and by adjustment of the read out mechanism. The torque tube assemblies, which are commercially available operate according to the formula:

$$\theta = \frac{32lTL}{\pi(D^4-d^4)G}$$

wherein:

$T$ = force on torque arm in pounds
$\theta$ = angle of twist in radians
$l$ = length of torque arm in inches
$L$ = length of torque tube in inches
$D$ = outside diameter of torque tube in inches
$d$ = inside diameter of torque tube in inches
$G$ = modulus of rigidity of torque tube in pounds per square inch
$\pi$ = ratio 22/7

All of these quantities are constants in a given torque tube assembly, except $\theta$ and T. In practice it has been found desirable to limit $\theta$ to 5° maximum angular deflection for any given viscosity range by means of mechanical stops.

The apparatus of the present invention, whereby viscosity is measured by a torque tube arranged so that the viscous action of a fluid passing through the viscometers, is caused to develop a torque proportional to fluid viscosity, offers salient advantages in measuring accuracy over known apparatus wherein bearing-mounted fully rotative sensing elements are employed because in the present invention friction losses and other stray power losses are greatly reduced. The operation of a torque tube assembly, as used in the present invention, approaches that of an ideal bearing virtually eliminating mechanical frictional and hysteresis losses. A further advantage of my invention is its rapid speed of response brought about by the feature of viscosity being represented by only a small angular displacement of the torque tube due to twist imparted by the rotational shear force transmitted through the viscous sample.

The viscometer of the present invention permits continuous viscosity measurement and also allows simplified interchangeability of torque tube assemblies for range changing.

The design feature of the helical screw in one embodiment of apparatus according to my invention accomplishes dual functions by providing an internal integrally driven force feed pump useful in handling more viscous fluids and also providing a long heat stabilization path when temperature control is employed.

While, in the foregoing description, certain specific details and operative steps have been set forth, together with certain suggested modifications, variation may be made in these without departing from the spirit of the present invention. The foregoing description has been given for clearness of understanding only, and no unnecessary limitations should be understood therefrom.

What is claimed is:

1. A viscometer comprising, in combination, a body having a hollow interior defined by a cylindrical wall extending longitudinally therethrough; a cap assembly closing one end of said hollow interior; a base assembly closing another end of said interior; a cylindrically hollow helical screw extending throughout said hollow interior, arranged concentrically therein to divide said hollow interior into an outer heliform passage and an inner cylindrical passage, said screw having a spiral peripheral land surface in sliding contact with said cylindrical wall and a passage connecting said outer heliform passage and said inner cylindrical passage; fluid inlet means connected to said outer heliform passage; fluid outlet means connected to said inner cylindrical passage; a shaft rotatably mounted in and extending through said base assembly in longitudinally concentric alignment with said hollow interior and said helical screw and operably attached to said helical screw; means to impart rotational movement to said shaft; a torque-sensitive tube assembly extending through said cap assembly into and in concentric alignment with said inner cylindrical passage; and means operably connected to said torque-sensitve tube assembly to convert sensed torque to an output signal.

2. Apparatus according to claim 1 wherein said fluid outlet means connected to said inner cylindrical passage is comprised in the shaft extending through said base assembly.

References Cited in the file of this patent

UNITED STATES PATENTS

| 2,096,222 | Bock | Oct. 19, 1957 |
| 2,817,231 | Barstow | Dec. 24, 1957 |

FOREIGN PATENTS

| 764,850 | Great Britain | Jan. 2, 1957 |